United States Patent
Lee

(10) Patent No.: US 6,773,118 B2
(45) Date of Patent: Aug. 10, 2004

(54) APPARATUS FOR POSITIONING AND ADJUSTING A LIGHT PIPE

(75) Inventor: Hung-Cheng Lee, Junghe (TW)

(73) Assignee: BenQ Corporation, Taoyuan (TW)

( * ) Notice: Subject to any disclaimer, the term of this patent is extended or adjusted under 35 U.S.C. 154(b) by 29 days.

(21) Appl. No.: 10/247,194

(22) Filed: Sep. 19, 2002

(65) Prior Publication Data

US 2003/0053787 A1 Mar. 20, 2003

(30) Foreign Application Priority Data

Sep. 20, 2001 (TW) .................................. 90123150 A

(51) Int. Cl.⁷ ........................ G03B 21/14; G03B 21/00; G03B 17/00; G01D 11/28; F21V 7/04
(52) U.S. Cl. ........................... 353/122; 353/38; 362/26; 362/551; 396/267
(58) Field of Search ................... 353/38, 122; 362/26, 362/551; 396/267

(56) References Cited

U.S. PATENT DOCUMENTS

| | | | |
|---|---|---|---|
| 6,205,271 B1 * | 3/2001 | Bowron et al. ............... 385/31 |
| 6,264,376 B1 | 7/2001 | Savage, Jr. ................... 385/88 |
| 6,275,644 B1 | 8/2001 | Domas et al. ............... 385/146 |
| 6,341,876 B1 * | 1/2002 | Moss et al. .................. 362/268 |
| 6,364,493 B1 * | 4/2002 | Kakuta et al. ............... 353/122 |
| 6,428,216 B1 * | 8/2002 | Savage, Jr. ................... 385/88 |
| 6,578,999 B2 * | 6/2003 | Schmidt et al. ............. 362/556 |

* cited by examiner

Primary Examiner—Russell Adams
Assistant Examiner—Magda Cruz
(74) Attorney, Agent, or Firm—Snell & Wilmer L.L.P.

(57) ABSTRACT

An apparatus for positioning and adjusting a light pipe includes a bracket that is formed by folding a metallic plate. When the metallic plate is folded to form the bracket, a first end and a second end of the metallic plate perpendicularly press against each other to form a close space for accommodating the light pipe. The apparatus for positioning and adjusting a light pipe further includes a clip device for positioning the bracket. A first adjustment screw has a front end pressing against the side surface of the bracket. A second adjustment screw has a front end pressing against the bottom surface of the bracket. The horizontal position of the light pipe is modified by adjusting the first adjustment screw. The vertical position of the light pipe is modified by adjusting the second adjustment screw.

12 Claims, 7 Drawing Sheets

APPARATUS FOR POSITIONING AND ADJUSTING A LIGHT PIPE

This application claims priority of Taiwan Patent Application No.090123150 filed on Sep. 20, 2001.

FIELD OF INVENTION

The present invention relates to an apparatus for positioning and adjusting a light pipe, and more particularly, to an apparatus for positioning and adjusting a light pipe used in a digital light processing (DLP) projector.

BACKGROUND OF THE INVENTION

Cathode ray tubes (CRTs) have typically been used to project onto a screen or other viewing surface. CRTs are typically large in size and low in resolution, however. Accordingly, many projectors with cathode ray tubes are becoming replaced by liquid crystal display (LCD) technologies in recent years.

In a liquid crystal display (LCD) projector, a light source emits light through a trichromatic filter. Then, the light with three primary colors (e.g., red, green, and blue) is projected onto three portions of a liquid crystal display (LCD) panel to form an image. Generally speaking, the color saturation and the color temperature created by an LCD projector are typically better than those created by a CRT projector. A transmission-type LCD panel of is, however, generally limited by its transmission ratio. Hence, the luminous efficiency of a transmission-type LCD panel is typically lower than that of a reflective type LCD panel. Further, the size and weight of the transmission-type LCD panel cannot typically be decreased due to structural limitation in the optical engine.

Recently, digital light processing (DLP) technology has become available. A detailed description of an exemplary DLP technology may be found in, for example, U.S. Pat. No. 5,658,063. DLP technology was invented by Texas Instruments Incorporated located in Dallas, Tex., United States. In contrast to the LCD projecting technology, which typically projects light through the LCD panels, the DLP projecting technology transmits lights through a trichromatic wheel that is rotated in a high speed to a DLP chip. The lights are reflected by the DLP chip and projected to a screen or display to form an image. One component of the DLP projecting technology is a semiconductor device, such as a digital micromirror device (DMD), controlled by a binary pulse modulator. Exemplary DMD devices are manufactured by Texas Instruments Incorporated.

The DMD chip, which is used as a rapid reflective digital optical switch, precisely controls the light in the projector. Regarding the DLP technology, light is reflected by micromirrors into a reflective light, and then projected to a display to form an image. The size and the weight of a DLP projector can therefore be greatly decreased. At the same time, a better luminous efficiency and a higher resolution can be provided by a DLP projector. Because the DMD can reflect light with a high fill ratio, DMD holds to potential to provide a higher luminous efficiency than other technologies. Digital light processing technology is therefore commonly used in applications needing high brightness and high resolution. In addition, the DLP technology typically has better heat dissipation capability than CRTs or flat panel displays so that it can use a light source with higher wattage without reducing the design lifetime of a DMD. Because DLP technology is typically an entirely digital design, the images produced are more stable and precise than those generated by other technologies.

In a DLP projector, a light pipe disposed between the light source and the optical engine is an important refractive optical component. The light pipe typically needs horizontal and vertical adjustment to meet requirement for the projected images. As a result, the light pipe needs a positioning and adjusting device.

Generally, a clip device and a bracket are used as positioning apparatus for the light pipe of the DLP projector. Screws are used to adjust the horizontal position and the vertical position of the light pipe. Referring to FIG. 1A, a light pipe 13 has a positioning and adjusting apparatus according to the prior art. The prior art utilizes the elasticity of clip device 11 to maintain light pipe 13 on alloy plate 121 of aluminum and magnesium of optical engine 12 so as to position light pipe 13. A screw 14 may be used to adjust the horizontal position of light pipe 13, and screw 15 may be used to adjust the vertical position of light pipe 13. Referring to FIG. 1B, because light pipe 13 is typically assembled by four pieces of glass 131, 132, 133, and 134, the surfaces of the four pieces of glass 131, 132, 133, and 134 can only bear relatively small stresses. To avoid overstressing the glass, clip device 11 positions light pipe 13 by using U-shaped brackets 16 and 17 which are attached on light pipe 13.

In the prior art, when screw 14 is used to adjust the horizontal position of the light pipe 13, U-shaped bracket 16 is deformed inward exert force to light pipe 13. The assembled light pipe 13 in the prior art is shown in FIG. 1B. In extreme cases, light pipe 13 might not sustain the side stress, potentially resulting in breakdown of side glasses 131 and 133. On the contrary, under the same condition, when screw 15 is used to adjust the vertical position of light pipe 13, the light pipe 13 needs to sustain both the upward stress and downward stress created. However, top glass 132 and bottom glass 134 are both supported by the two side glasses 131 and 133 so that light pipe 13 is not easy to break down.

While designing apparatus for positioning and adjusting in a light pipe 13 shown in FIGS. 1A and 1B, it is typically necessary to calculate the elastic force and pressure created to prevent the light pipe 13 from breaking down. The elastic force is generated by the clip device 11 and the pressure is sustained by the light pipe 13. These calculations make the design of a projector more difficult. In addition, the tolerance accuracy of the mold and the pressing stability should be controlled precisely during the manufacturing process of clip device 11 and U-shaped brackets 16 and 17. Further, the stress loaded on the side surface of light pipe 13 needs to be considered, and thermal effects to light pipe 13 is also an important issue to prevent light pipe 13 from breaking down. That is, when light passes through light pipe 13 and the temperature is over a heat-resistant value of the adhesive glue, light pipe 13 has the potential to deform or break down. In addition, U-shaped brackets 16 and 17, which are attached on the surface of light pipe 13, also may retard heat dissipation of light pipe 13 and lead to break down of heat pipe 13.

Because there are many factors to consider when designing a prior art light pipe adjustment structure, a novel approach for positioning and adjusting the light pipe is desired.

SUMMARY OF THE INVENTION

It is one aspect of the present invention to provide an apparatus for positioning and adjusting a light pipe to prevent the light pipe from deforming or breaking down. To accomplish this purpose, various embodiments of the present invention provide an apparatus for positioning and adjusting a light pipe. The light pipe is installed on a plate of an optical engine in a projector. The positioning and adjusting apparatus includes a bracket, a clip apparatus, a first adjustment screw, and a second adjustment screw. The bracket is formed by folding a metallic plate which has a first end and a second end. When the metallic plate is folded into the bracket, the first end and the second end perpendicularly press against each other to form a close space for accommodating the light pipe. The clip apparatus may then be used to position the bracket. The front end of the first adjustment screw presses against a side surface of the bracket so that the horizontal position of the light pipe is modified by adjusting the first screw. The front end of the second adjustment screw presses against a bottom surface of the bracket so that the vertical position of the light pipe is modified by adjusting the second screw.

It is an alternative aspect of the present invention to provide a positioning and adjusting apparatus whose material is easy to obtain and the manufacture of which is simple. For this purpose, the metallic plate of the present invention may be made of stainless steel.

It is an alternative aspect of the present invention to provide a positioning and adjusting apparatus which has better heat dissipation ability to prevent the light pipe from breaking down. For this purpose, the bracket further includes at least a protrusion. The protrusion contacts with each glass of the light pipe at the lateral-side surfaces. By reducing the contact area between the bracket and the light pipe, a better heat dissipation ability is provided.

These and other aspects of the present invention will become apparent after having read the following detailed description of exemplary embodiments that are illustrated in the various figures and drawings, wherein like numerals denote like components.

DETAILED DESCRIPTION OF EXEMPLARY EMBODIMENTS

Generally, a light pipe is disposed on a base surface of an optical engine and is optically coupled to a light source. A light from the light source is first refracted in the inner surface of the light pipe. The light is then transmitted through a color wheel with red, blue and green color filters (or other appropriate colors) on the optical engine. The light may then be projected onto the digital micromirror device (DMD) chip and reflected by the DMD chip to form an image.

Figure 1A:
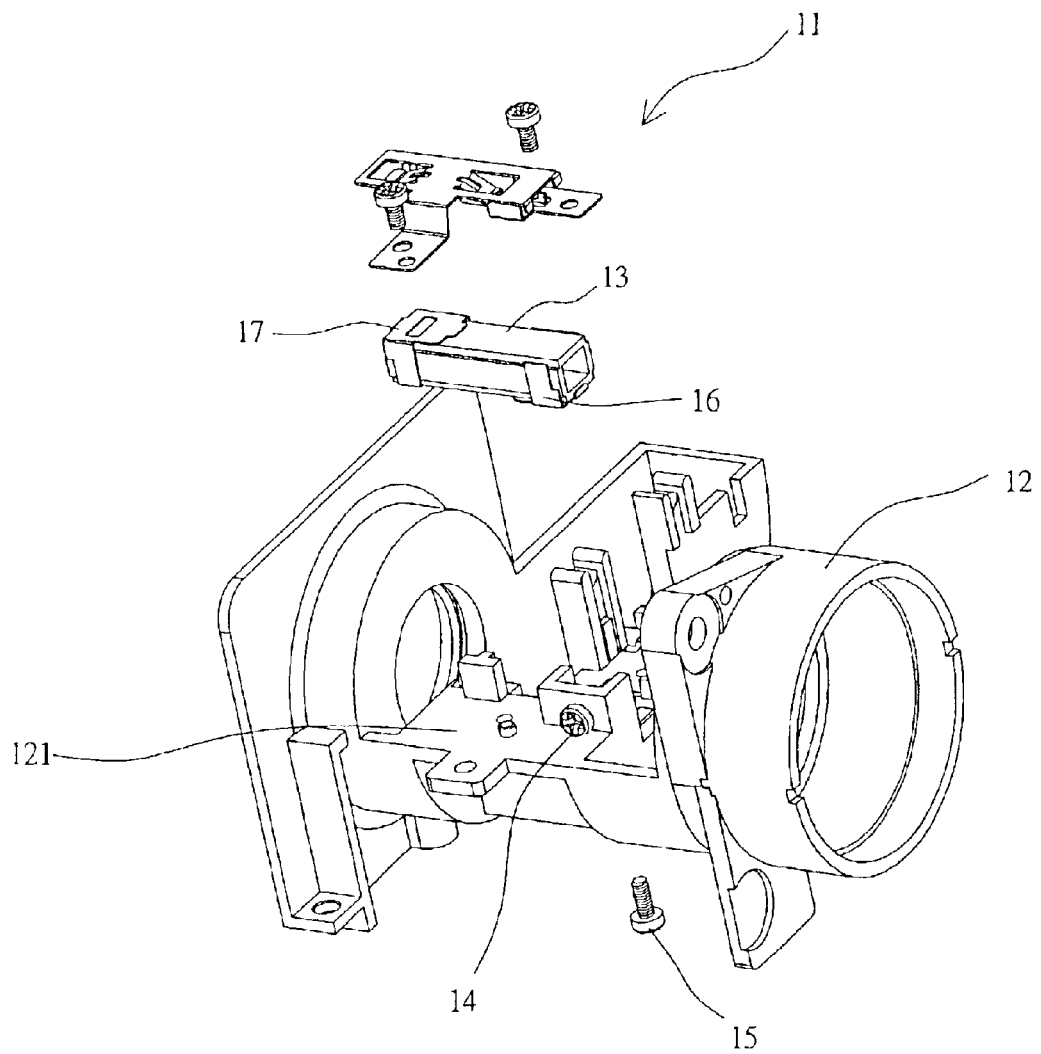
FIG. 1A is a schematic diagram of an exemplary apparatus for positioning and adjusting a light pipe according to the prior art.
Figure 1B:
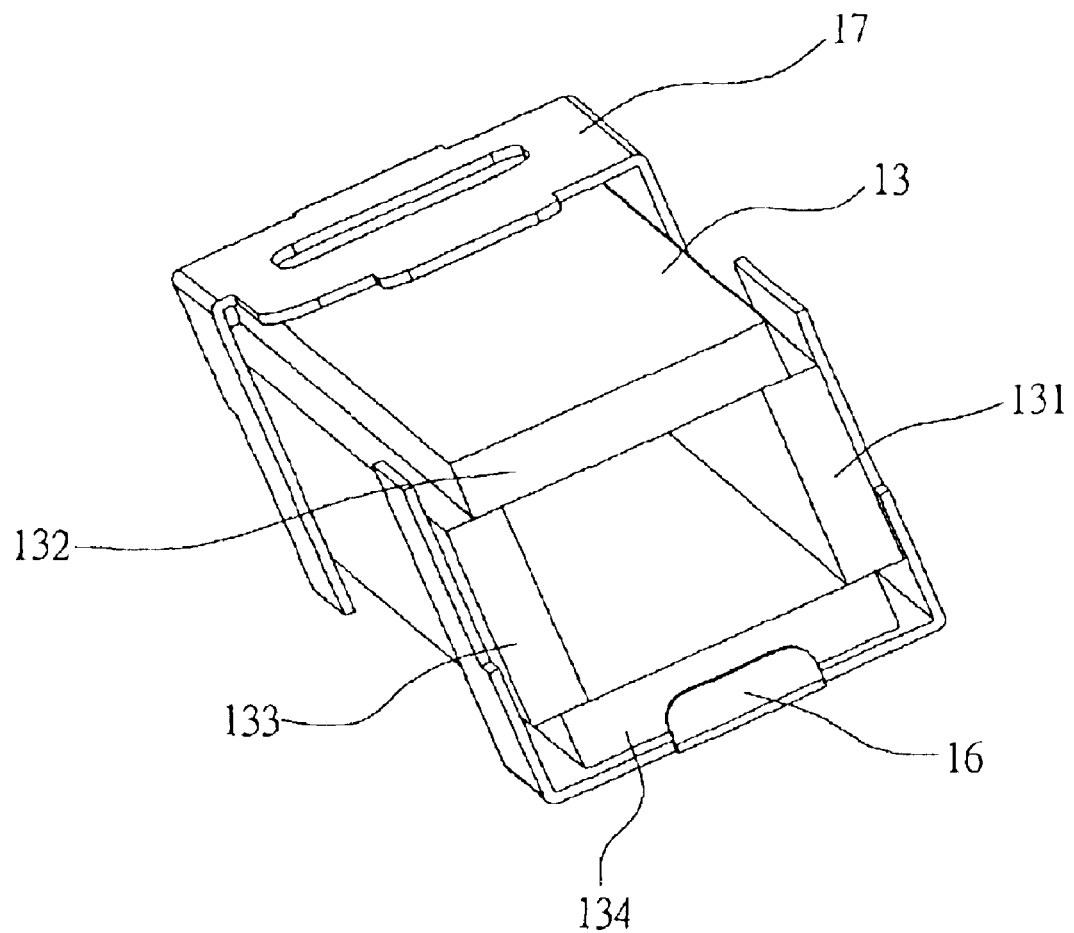
FIG. 1B is a schematic diagram of the light pipe and a U-shaped bracket shown in FIG. 1A.
Figure 2A:
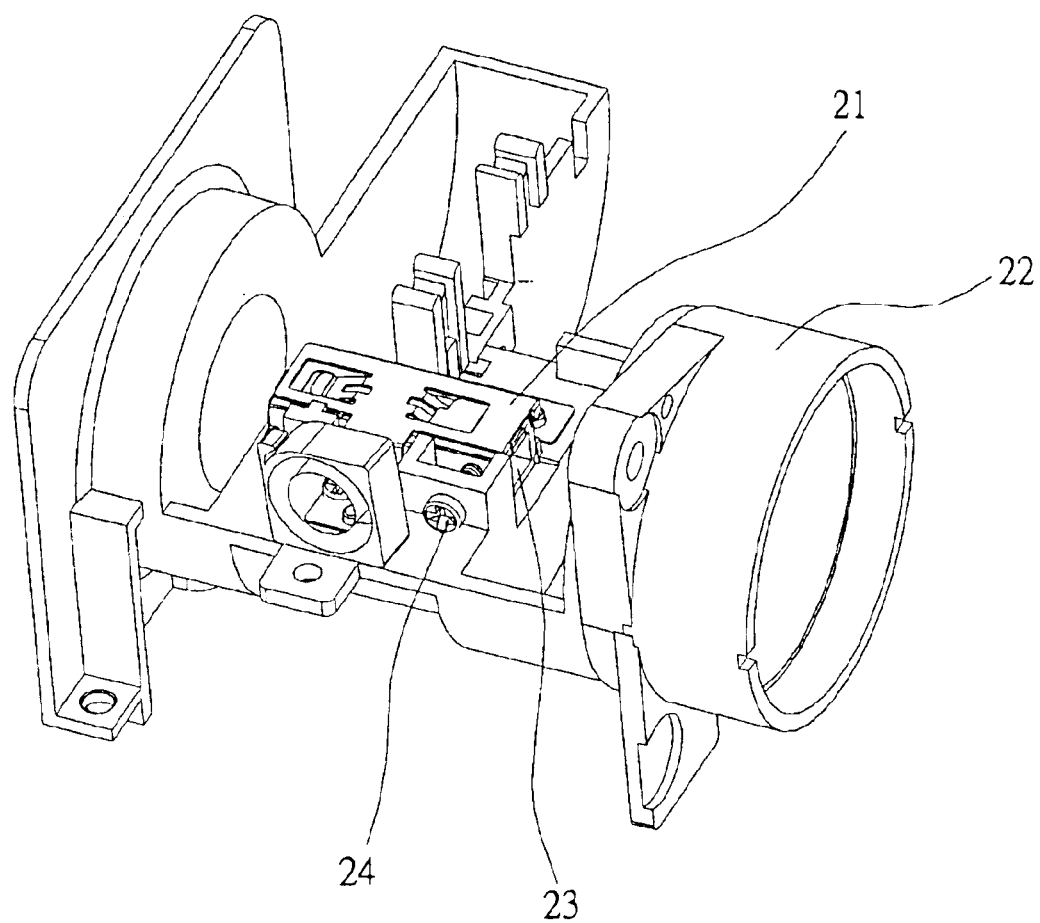
FIG. 2A shows an exemplary embodiment according to the present invention in assembly form.
Figure 2B:
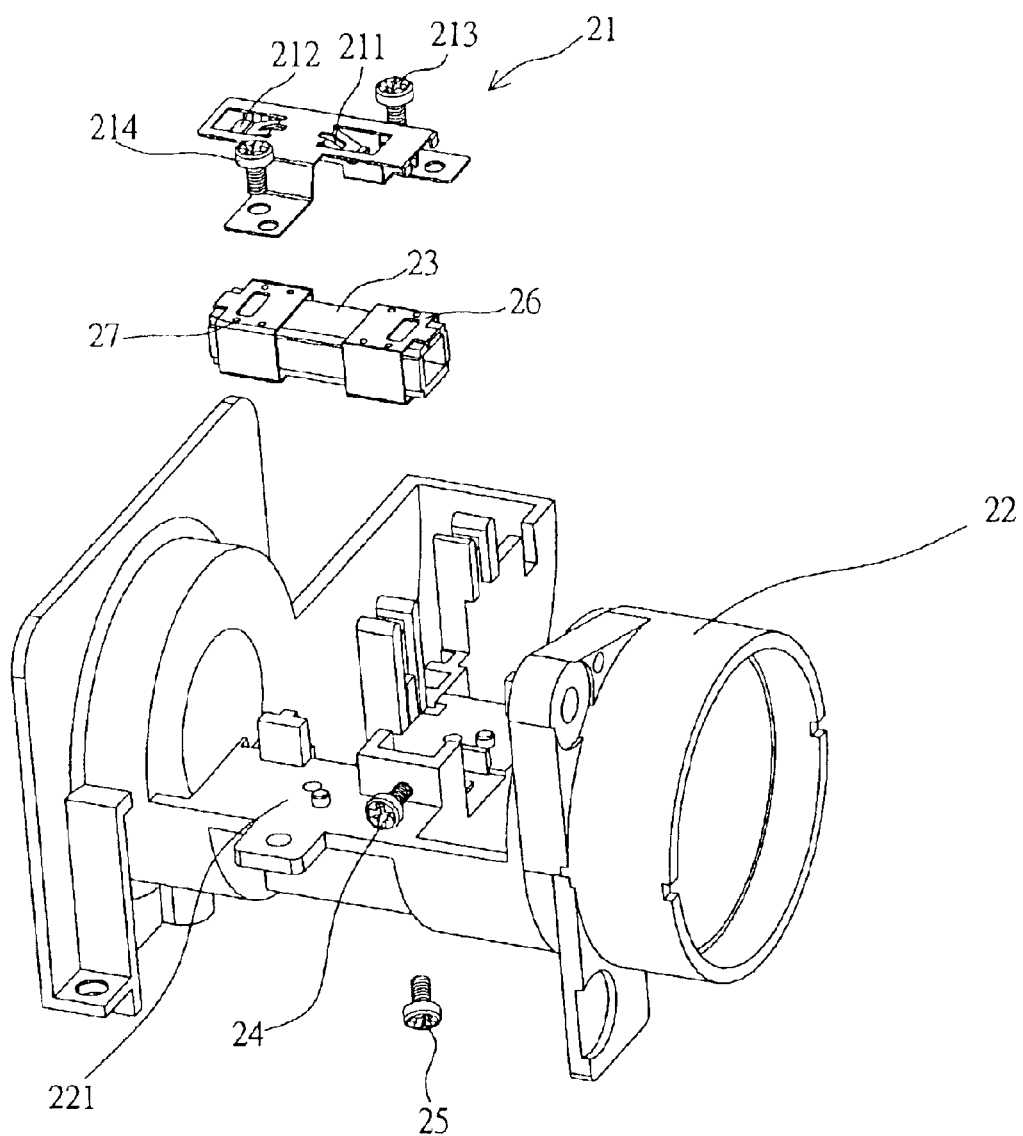
FIG. 2B is an exploded view of embodiment shown in FIG. 2A.

Referring to FIGS. 2A and 2B, an exemplary apparatus of present invention provides a clip device 21 and brackets 26, 27 to position a light pipe 23 on a plate 221 of an optical engine 22. Clip device 21, optical engine 22, and light pipe 23 may be identical to clip device 11, optical engine 12, and light pipe 13 in the prior art, or may be implemented with other devices presently known or subsequently developed. In various embodiments of the present invention, brackets 26, 27 suitably replace U-shaped brackets 16, 17 in FIG. 1A.

As shown in FIGS. 2A and 2B, clip device 21 suitably includes elastic plates 211, 212 and screws 213, 214. Brackets 26, 27 are attached to two ends of light pipe 23, respectively. Elastic plates 211 and 212 respectively contact with brackets 26 and 27. Brackets 26, 27 and light pipe 23 are respectively connected to a plane 221 of optical engine 22 by screws 213 and 214. Light pipe 23 is therefore positioned by the clip device 21, as appropriate In addition, elastic plates 211 and 212 respectively contact with top surfaces of brackets 26, 27 instead of contacting with light pipe 23 directly. Hence, concentration of pressure does not result in the breakdown of light pipe 23.

In addition, as shown in FIGS. 2A and 2B, the horizontal position of light pipe 23 may be modified or adjusted by first adjustment screw 24. The vertical position of the light pipe 23 is modified or adjusted by second adjustment screw 25. First adjustment screw 24 suitably presses against the side surface of bracket 26 such that the horizontal position of light pipe 23 is adjusted by the horizontal movement of bracket 26. Accordingly, light pipe 23 is prevented from breaking down. Suitably, when the vertical position of light pipe 23 is adjusted, second adjustment screw 25 presses against the bottom surface of bracket 26, such that the vertical position of the light pipe 23 is adjusted by the vertical movement of bracket 26. Therefore, light pipe 23 is again prevented from breaking down.

Figure 3A:
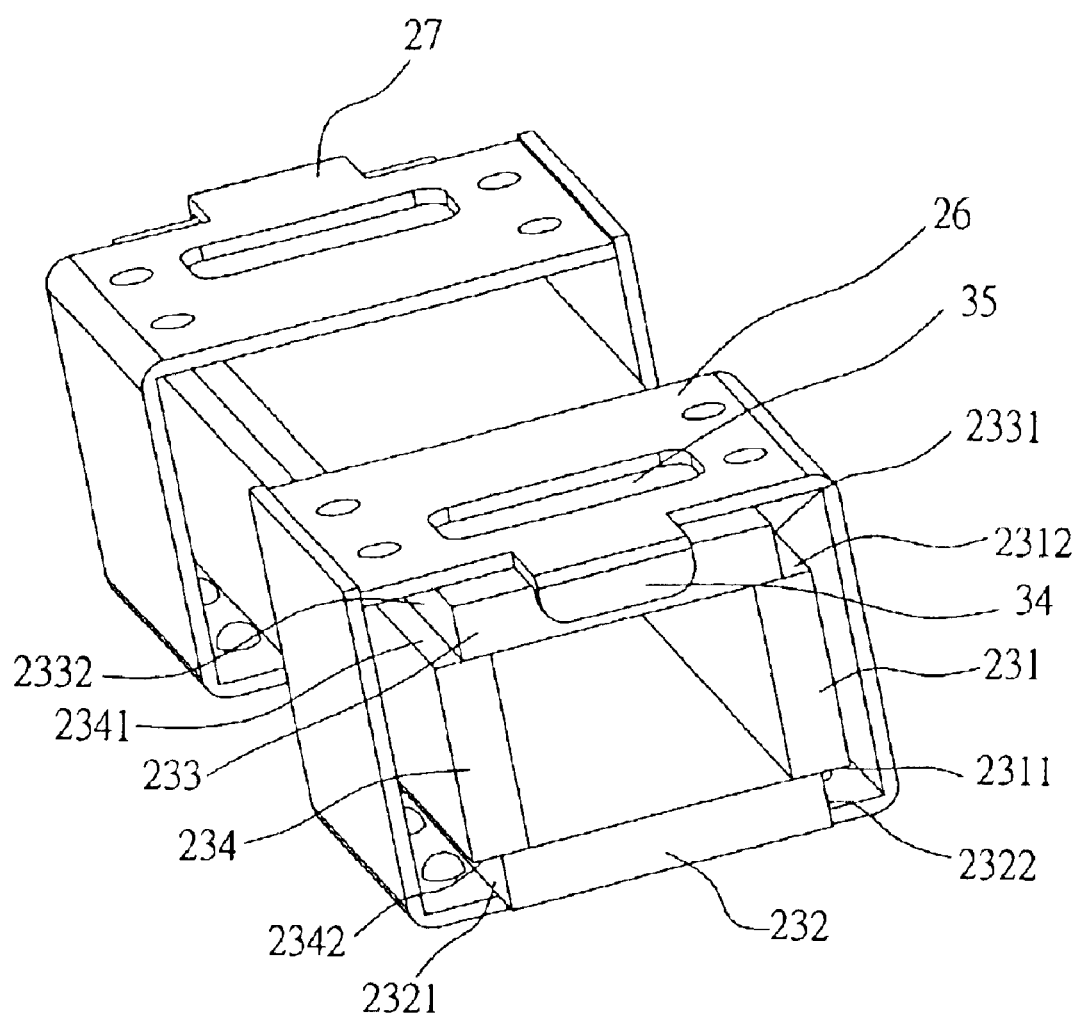
FIG. 3A shows the light pipe and the bracket according to one exemplary embodiment.
Figure 3B:
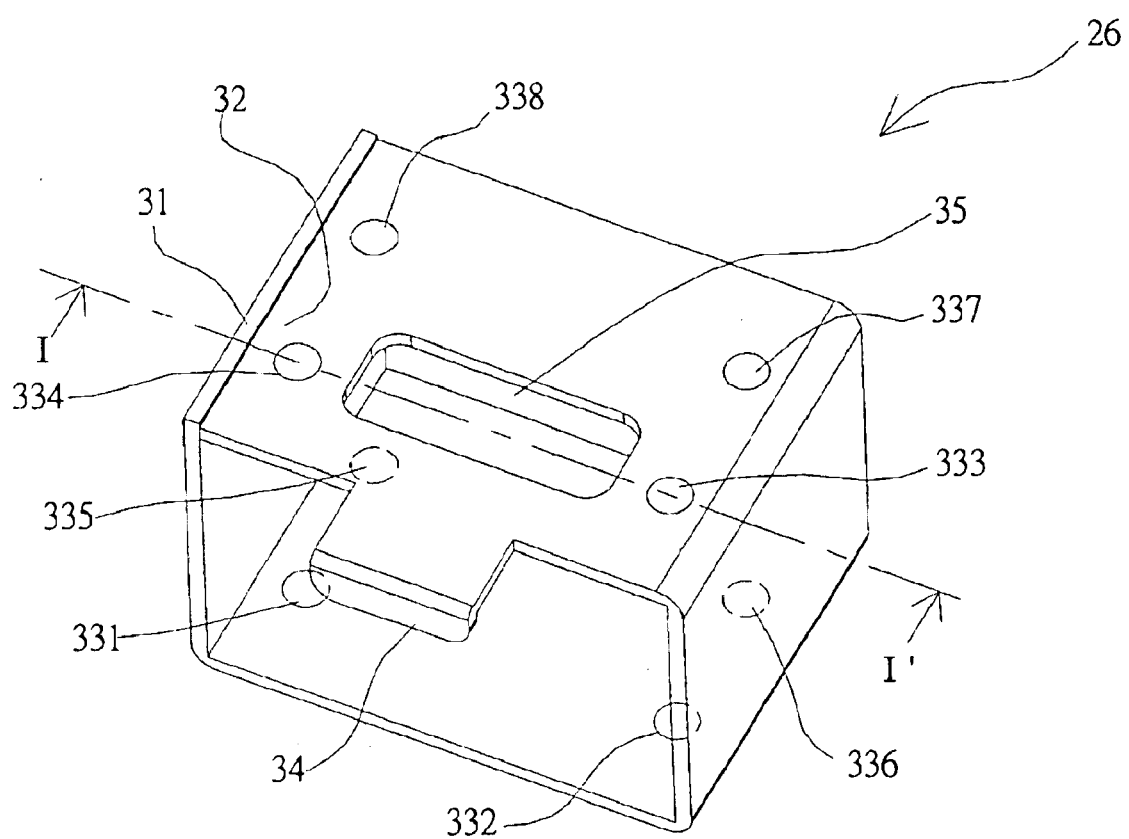
FIG. 3B shows the bracket of FIG. 3A in additional detail.
Figure 3C:
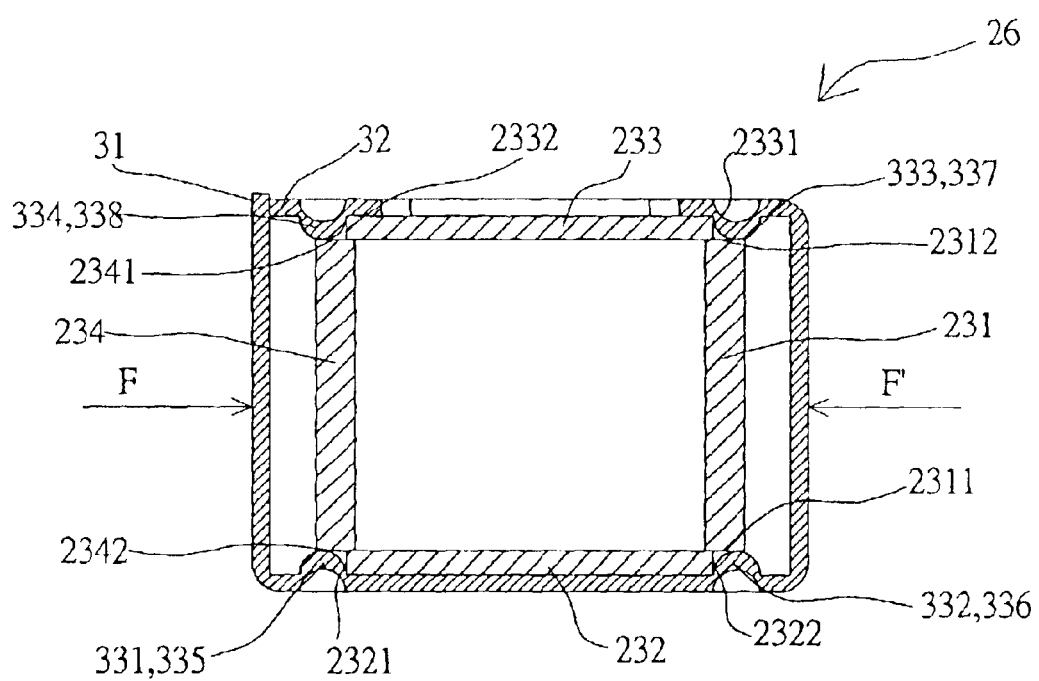
FIG. 3C is a cross-sectional view along line I–I' of the bracket shown in FIG. 3B.

FIGS. 3A, 3B, and 3C show further exemplary brackets 26 and 27. Since bracket 26 in the exemplary embodiment is identical to bracket 27, only bracket 26 needs to be described in the following text. Similar concepts could be applied to bracket 27, as appropriate.

As shown in FIG. 3A, light pipe 23 is formed by adhering a top glass 233, a bottom glass 232, a right glass 231, and a left glass 234. Brackets 26 and 27 are respectively attached onto the two ends of light pipe 23. In other words, each of brackets 26 and 27 has a groove 35 for disposing a glue or other adhesive inside it so that brackets 26 and 27 are adhered on light pipe 23. Furthermore, each of brackets 26 and 27 includes a positioning stopper plate 34 to position brackets 26 and 27, respectively, on the two ends of light pipe 23.

As shown in FIGS. 3B and 3C, bracket 26 is formed by folding a metallic plate. In an exemplary embodiment, the metallic plate is made of stainless steel. The metallic plate has a first end 31 and a second end 32. When the metallic plate is folded to form bracket 26, first end 31 and second end 32 are suitably perpendicularly pressing to each other. The term "substantially" here is intended to include minor deviations from the perpendicular due to design variations and the like. Such deviations are typically within about +/−15°. Accordingly, when a stress F and its counter stress F' from the side surface are loaded on bracket 26, as shown in FIG. 3C, second end 32 perpendicularly presses against and is supported by first end 31. As a result, bracket 26 is difficult to deform compared to U-shaped bracket 16 of the prior art.

In an exemplary embodiment, at least a protrusion (which may be formed by molding, stamping pressing, or any other techniques), is further provided on an inner surface of bracket 26 to contact with light pipe 23. Due to the protrusion, the area for sustaining stress on light pipe 23 is decreased without affecting enhancement of the heat dissipation efficiency.

Referring now to FIGS. 3A, 3B, and 3C, protrusions 331, 332, 333, 334, 335, 336, 337, and 338 are formed on the inner surface of bracket 26 by stamping or other processing technology. Bracket 26 uses protrusions 331, 332, 333, 334, 335, 336, 337, and 338 to contact with top glass 233, bottom glass 232, right glass 231, and left glass 234, respectively. Bracket 26 therefore contacts with light pipe 23 by points, not by surfaces. This kind of contact greatly decreases the stress area on light pipe 23. Furthermore, because U-shaped bracket 16 is typically completely adhered to light pipe 13 in the prior art, one difference between the prior art and various embodiments of the present invention is that there is a space between bracket 26 and light pipe 23 allowing heat dissipation.

In addition, in the exemplary embodiment, at least one protrusion of bracket 26 contacts with top glass 233, bottom glass 232, right glass 231, or left glass 234 at the lateral-side of the glass. The stress area of light pipe 23 is decreased to a minimum to prevent light pipe 23 from breaking down.

Referring to FIGS. 3A and 3C, top glass 233 has a right lateral-side surface 2331 and a left lateral-side surface 2332. Bottom glass 232 has a right lateral-side surface 2322 and a left lateral-side surface 2321. Right glass 231 has a top surface 2312 and a bottom surface 2311. Left glass 234 has a top surface 2341 and a bottom surface 2342. Protrusions 331 and 335, respectively, press against bottom surface 2342 and left lateral-side surface 2321 at the same time. Protrusions 334 and 338, respectively, press against top surface 2341 and left lateral-side surface 2332 at the same time. Protrusions 332 and 336, respectively, press against bottom surface 2311 and right lateral-side surface 2322 at the same time. Protrusions 333 and 337, respectively, press against top surface 232 and right lateral-side surface 2332 at the same time. Accordingly, the stress area of light pipe 23 is suitably decreased. Moreover, the stresses loading on top glass 233, bottom glass 232, right glass 231, or left glass 234 of light pipe 23 at the lateral-side surface prevent light pipe 23 from breaking down, as appropriate.

Those skilled in the art will readily observe that numerous modifications and alterations of the device may be made within the teaching of the invention. Accordingly, the above disclosure should be construed as limited only by the appended claims and their legal equivalents.

What is claimed is:

1. An apparatus for positioning and adjusting a light pipe, said light pipe including a top glass, a bottom glass, a right glass and a left glass, said light pipe being installed on an optical engine of a projector, said apparatus comprising:

a bracket formed by a metallic plate, said metallic plate comprising a first end and a second end, wherein said bracket is formed by folding said metallic plate, and wherein said first end and said second end substantially perpendicularly press to each other to form a space to accommodate said light pipe, said bracket having at least a protrusion, said protrusion contacting with said light pipe at a lateral-side surface;

a clip device for positioning said bracket; and a first adjustment screw having a front end, said front end of said first adjustment screw pressing against a side surface of said bracket, a horizontal position of said light pipe being adjusted by said first screw and said protrusion; and a second adjustment screw having a front end, said front end of said second adjustment screw pressing against a bottom surface of said bracket, a vertical position of said light pipe being adjusted by said second screw and said protrusion.

2. The apparatus of claim 1 wherein said metallic plate is made of stainless steel.

3. The apparatus of claim 1, wherein said protrusion contacts with a lateral-side surface of said top glass.

4. The apparatus of claim 1, wherein said protrusion contacts with a lateral-side surface of said bottom glass.

5. The apparatus of claim 1, wherein said protrusion contacts with a lateral-side surface of said right glass.

6. The apparatus of claim 1, wherein said protrusion contacts with a lateral-side surface of said left glass.

7. The apparatus of claim 1, wherein said bracket further comprises:

a first protrusion and a second protrusion respectively contacting with a left lateral-side surface of said bottom glass and a bottom surface of said left glass;

a third protrusion and a fourth protrusion respectively contacting with a right lateral-side surface of said bottom glass and a bottom surface of said right glass;

a fifth protrusion and a sixth protrusion respectively contacting with a left lateral-side surface of said top glass and a top surface of said left glass; and a seventh protrusion and an eighth protrusion respectively contacting with a right lateral-side surface of said top glass and a top surface of said right glass.

8. An apparatus for positioning and adjusting a light pipe, said light pipe being installed on an optical engine, said light pipe including a top glass, a bottom glass, a right glass, and a left glass, said top glass comprising a left lateral-side surface of said top glass and a right lateral-side surfaces of said top glass, and said bottom glass comprising a left lateral-side surface of said bottom glass and a right lateral-side surface of said bottom glass, said apparatus comprising:

a clip device fixed on said optical engine to form a space between said clip device and said optical engine;

a bracket disposed in said space, said bracket including at least a protrusion, said protrusion contacting with said glass at a lateral-side surface;

a horizontal adjustment device disposed on and being movable horizontally with said optical engine, said horizontal adjustment device pressing against a side surface of said bracket, a horizontal position of said light pipe being adjusted by said horizontal adjustment device and said protrusion; and a vertical adjustment device disposed on and being movable vertically with said optical engine, said vertical adjustment device pressing against a bottom surface of said bracket, a vertical position of said light pipe being adjusted by said vertical adjustment device and said protrusion.

9. The apparatus of claim 8, wherein said protrusion further comprises an upper left protrusion and an upper right protrusion, said upper left protrusion contacting with said left lateral-side surface of said top glass, and said upper right protrusion contacting with said right lateral-side surface of said top glass.

10. The apparatus of claim 9, wherein said protrusion further comprises a lower left protrusion and a lower right protrusion, said lower left protrusion contacting with said left lateral-side surface of said bottom glass, and said lower right protrusion contacting with said right lateral-side surface of said bottom glass.

11. The apparatus of claim 10, wherein said right glass comprises a top surface and a bottom surface, said upper right protrusion contacting with said top surface and said right lateral-side surface, and said lower right protrusion contacting with said bottom surface and said right lateral-side surface.

12. The apparatus of claim 10, wherein said left glass comprises a top surface and a bottom surface, said upper left protrusion contacting with said top surface and said left lateral-side surface, said lower left protrusion contacting with said bottom surface and said left lateral-side surface.

* * * * *